United States Patent
Montemurro et al.

(10) Patent No.: US 9,866,558 B2
(45) Date of Patent: Jan. 9, 2018

(54) DEVICE, METHOD AND SYSTEM FOR ENABLING MULTIPLE WIRELESS COMMUNICATION DEVICES TO COMMUNICATE WITH A TRUSTED NETWORK VIA A SECURE CONNECTION

(71) Applicant: BLACKBERRY LIMITED, Waterloo (CA)

(72) Inventors: Michael Peter Montemurro, Toronto (CA); Robert David Turner, Kanata (CA)

(73) Assignee: BLACKBERRY LIMITED, Waterloo (CA)

( * ) Notice: Subject to any disclaimer, the term of this patent is extended or adjusted under 35 U.S.C. 154(b) by 69 days.

(21) Appl. No.: 14/957,921

(22) Filed: Dec. 3, 2015

(65) Prior Publication Data

US 2017/0163643 A1 Jun. 8, 2017

(51) Int. Cl.
*H04L 29/00* (2006.01)
*H04L 29/06* (2006.01)
(Continued)

(52) U.S. Cl.
CPC ........ *H04L 63/0892* (2013.01); *G06F 21/606* (2013.01); *H04W 12/04* (2013.01); *H04W 12/08* (2013.01); *H04W 76/02* (2013.01); *H04L 63/0272* (2013.01); *H04W 12/02* (2013.01); *H04W 12/06* (2013.01); *H04W 84/12* (2013.01); *H04W 88/08* (2013.01)

(58) Field of Classification Search
None
See application file for complete search history.

(56) References Cited

U.S. PATENT DOCUMENTS 9,078,137 B1  7/2015 Chechani et al.
9,220,007 B2 * 12/2015 Remaker ............. H04L 63/0421
(Continued)

OTHER PUBLICATIONS

Extended European Search Report dated Mar. 24, 2017 for European Patent Application No. 16201897.2.
(Continued)

*Primary Examiner* — Madhuri Herzog
(74) *Attorney, Agent, or Firm* — Perry + Currier Inc.

(57) ABSTRACT

The present disclosure provides a device, method, and system for enabling multiple wireless communication devices to communicate with a trusted network over a secure connection. The device includes a communication interface configured to communicate with the wireless communication devices and local area networks (LANs) and a processor configured to: broadcast a non-trusted service set identifier (SSID); in response to detecting a non-secure connection to a wireless communication device of the wireless communication devices using the non-trusted SSID, establish a connection to a local area network (LAN) of the LANs. In response to establishing a connection to the LAN: the processor establishes a secure connection to the trusted network; discontinues broadcast of the non-trusted SSID; and broadcasts a trusted SSID to the wireless communication devices to enable the wireless communication devices to wirelessly connect to the network device to communicate with the trusted network using the secure connection.

22 Claims, 10 Drawing Sheets

(51) Int. Cl.
*G06F 21/60* (2013.01)
*H04W 12/08* (2009.01)
*H04W 76/02* (2009.01)
*H04W 12/04* (2009.01)
*H04W 12/06* (2009.01)
*H04W 84/12* (2009.01)
*H04W 88/08* (2009.01)
*H04W 12/02* (2009.01)

(56) References Cited

U.S. PATENT DOCUMENTS

| | | | | |
|---|---|---|---|---|
| 2011/0078443 | A1* | 3/2011 | Greenstein | H04L 63/061 |
| | | | | 713/169 |
| 2012/0213211 | A1* | 8/2012 | Remaker | H04L 63/0421 |
| | | | | 370/338 |
| 2012/0317619 | A1* | 12/2012 | Dattagupta | H04L 63/18 |
| | | | | 726/4 |
| 2017/0223536 | A1* | 8/2017 | Gupta | H04W 12/06 |
| | | | | 726/5 |

OTHER PUBLICATIONS

D-Link: "User Manual D-Link DAP-1620 AC1200 Wi-Fi Range Extender", Sep. 8, 2015 (Sep. 8, 2015), XP055354577, Retrieved from the Internet: URL:http://www.dlink.com/cz/cs/-/media/consumer_products/dap/dap-1620/manual/dap_1620_a1_manual_v1_00 eu.pdf [retrieved on Mar. 14, 2017] p. 19-p. 29.

* cited by examiner

DEVICE, METHOD AND SYSTEM FOR ENABLING MULTIPLE WIRELESS COMMUNICATION DEVICES TO COMMUNICATE WITH A TRUSTED NETWORK VIA A SECURE CONNECTION

FIELD

The present disclosure relates generally to a device, method and system for enabling multiple wireless communication devices to communicate with a trusted network via a secure connection.

BACKGROUND

Known methods for establishing a secure connection between a wireless communication device and a trusted network involves establishing a wireless connection between the wireless communication device and an open wireless local area network (WLAN) and then having a user provision, configure and launch a client stored on the wireless communication device to establish the secure connection to the trusted network via secure sockets layer (SSL) or Internet Protocol Security (IPSEC). Often, a user has multiple wireless communication devices and wants to establish a secure connection between each of wireless communication device and the trusted network. This requires provisioning, configuring and launching a client stored on each of wireless communication device, which can be difficult, cumbersome and time consuming.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

The following describes a device, method, and system for enabling multiple wireless communication devices to communicate with a trusted network via a secure connection.

In the present disclosure, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this disclosure, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the present disclosure provides a device comprising a communication interface configured to communicate with wireless communication devices and local area networks (LANs); and a processor operably coupled to the communication interface and configured to: broadcast a non-trusted service set identifier (SSID); in response to detecting a non-secure connection to a wireless communication device of the wireless communication devices using the non-trusted SSID, establish a connection to a local area network (LAN) of the LANs; and in response to establishing a connection to the LAN: establish a secure connection to the trusted network; discontinue broadcast of the non-trusted SSID; and broadcast a trusted SSID to the wireless communication devices to enable the wireless communication devices to wirelessly connect to the device to communicate with the trusted network via the secure connection.

The non-trusted SSID can be configured with WLAN link layer security.

The trusted network can be a trusted enterprise network or a trusted home network.

The trusted SSID can be configured with WPA2-Enterprise WLAN link layer security when the trusted network is a trusted enterprise network.

The trusted SSID can be configured with WPA2-Personal WLAN link layer security when the trusted network is a trusted home network.

The processor can be further configured to: in response to establishing the connection to the LAN: establish a secure link to an authentication, authorization, and accounting (AAA) server to provide the WPA-Enterprise link layer security or the WPA2-Enterprise WLAN link layer security for the trusted SSID when the trusted network is a trusted enterprise network.

The device can also include a memory storing a client executable by the processor to route, via the secure link and using a Remote Authentication Dial-In User Service (RADIUS) protocol, WLAN Extensible Authentication Protocol (EAP) authentication frames to the AAA server.

The processor can be further configured to: receive, via the secure link, policy information from the trusted network.

The processor can be further configured to: receive, via the secure link, at least one of policy information and accounting records from a service provider via the AAA server.

The network device can further include a power supply operably coupled to the processor and configured to power to the processor.

The network device can further include a power plug configured to connect to a socket of an alternating current (AC) power supply.

The power converter can be configured to convert AC current to direct current (DC) for powering the processor.

The network device can include a universal serial bus (USB) connector configured to connect to a USB socket of a wireless communication device, the USB connector operably coupled to the processor for powering to the processor.

Another aspect of the present disclosure provides a method for enabling wireless communication devices to communicate with a trusted network via a secure connection. The method comprises: at a device comprising a communication interface configured to communicate with the wireless communication devices and local area networks (LANs), and a processor, broadcasting a non-trusted service set identifier (SSID); in response to detecting a non-secure connection to a wireless communication device of the wireless communication devices, establishing a connection to a local area network (LAN) of the LANs; in response to establishing a connection to the LAN; establishing the secure connection to the trusted network; discontinuing broadcast of the non-trusted service set identifier (SSID); and broadcasting a trusted SSID to the wireless communication devices to enable the wireless communication devices to wirelessly connect to the device to communicate with the trusted network via the secure connection.

Another aspect of the present disclosure provides a non-transitory, tangible machine readable storage medium encoded with machine executable instructions, wherein execution of the machine executable instructions is for: at a device comprising a communication interface configured to communicate with the wireless communication devices and local area networks (LANs), and a processor, broadcasting a non-trusted service set identifier (SSID); in response to detecting a non-secure connection to a wireless communication device of the wireless communication devices, establishing a connection to a local area network (LAN) of the LANs; in response to establishing a connection to the LAN: establishing the secure connection to the trusted network; discontinuing broadcast of the non-trusted service set identifier (SSID); and broadcasting a trusted SSID to the wireless communication devices to enable the wireless communication devices to wirelessly connect to the device to communicate with the trusted network via the secure connection. For simplicity and clarity of illustration, reference numerals may be repeated among the figures to indicate corresponding or analogous elements. Numerous details are set forth to provide an understanding of the implementations described herein. The implementations may be practiced without these details. In other instances, well-known methods, procedures, and components have not been described in detail to avoid obscuring the implementations described. The present disclosure is not to be considered as limited to the scope of the implementations described herein.

Figure 1:
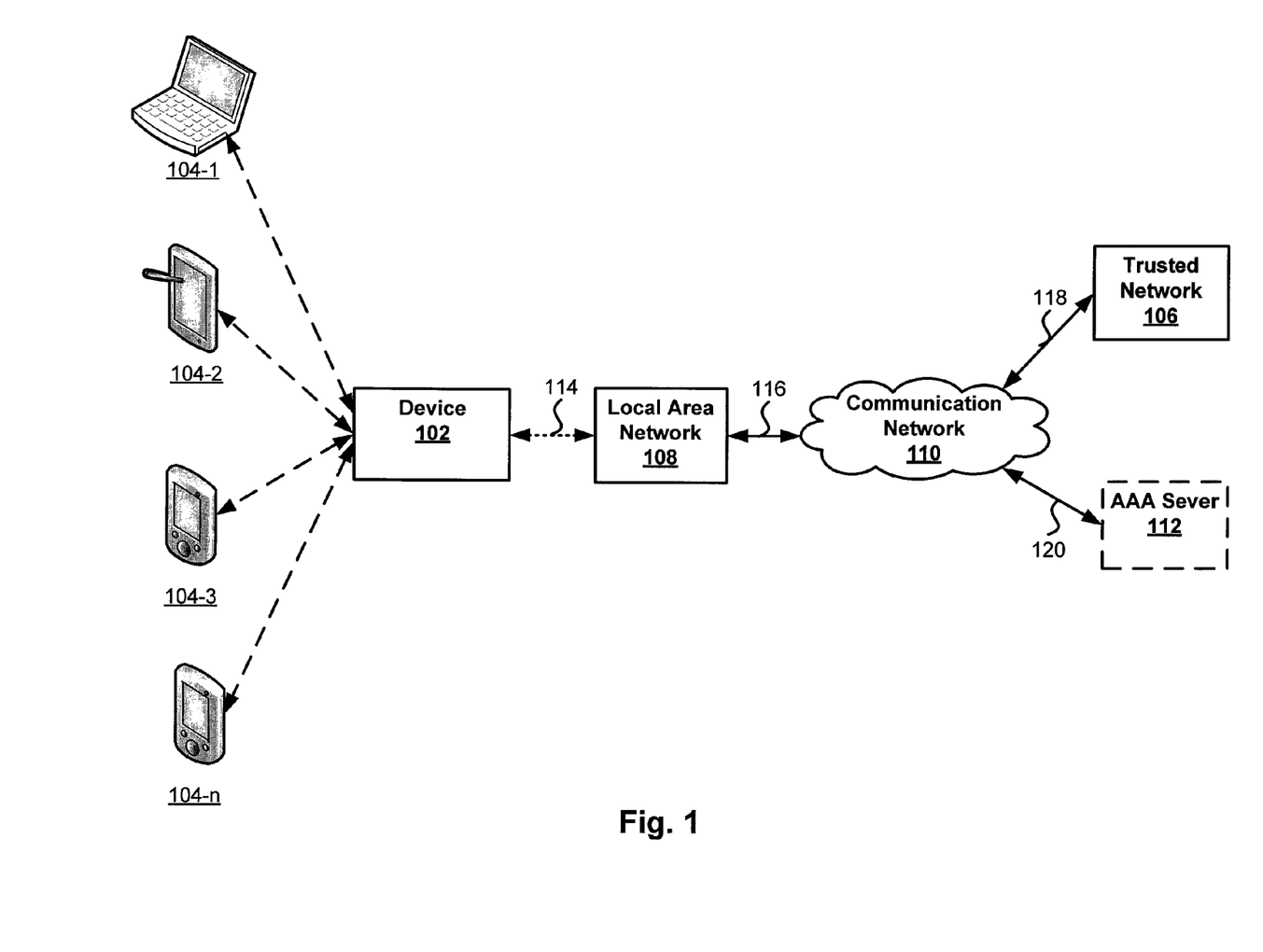
FIG. 1 is a block diagram of a system for enabling multiple wireless communication devices to communicate with a trusted network via a secure connection in accordance with non-limiting implementations.

FIG. 1 depicts an example of a system 100 that includes a device 102 that enables multiple wireless communication devices 104-1, 104-2, . . . , 104-n to communicate with a trusted network 106 via a secure connection, according to non-limiting implementations. System 100 comprises network device 102 that can wirelessly communicate with wireless communication devices 104-1, 104-2, . . . , 104-n, as further described below, a local area network (LAN) 108 in communication with trusted network 106 via at least one communications network 110, hereafter referred to as network 110 and optionally with an authentication, authorization, and accounting (AAA) server 112 via network 110. Wireless communication devices 104-1, 104-2, . . . , 104-n will be referred to herein generically as device 104 and collectively as devices 104.

Device 102 provides wireless communications coverage to devices 104 that are located within the wireless transmission area of device 102 and can wireless communicate with devices 104 as described in further detail below. Device 102 also communicates with LAN 108 via link 114 to establish a connection to LAN 108. Link 114 comprises any suitable link for device 102 to establish a connection to LAN 108 to communicate with LAN 108. Hence, link 114 can include any suitable combination of wired and/or wireless links, including but not limited to USB (universal serial bus) cables, Ethernet cables, wireless links, Bluetooth™ links, NFC (near field communication) links, WiFi links, WiMax links, access points, and the like, and/or a combination.

It will be appreciated that device 102 is configured to communicate with trusted network 106 via link 114 between device 102 and LAN 108, through LAN 108, via a link 116 between LAN 108 and network 110, through network 110, and via a link 118 between network 110 and trusted network 106. Optionally, device 102 is configured to communicate with AAA server 112 via link 114, through LAN 108, via link 116, through network 110, and via a link between network 110 and AAA server 112.

In a non-limiting implementation, LAN 108 is a wireless local area network (WLAN), such as, for example, a Wi-Fi network that generally follows standards set by the Institute of Electrical and Electronic Engineers (IEEE) LAN/MAN Standards Committee, known as IEEE 802, through its working group "11". The IEEE 802.11 standard defines media access control (MAC) and physical (PHY) layers in the Open Systems Interconnection (OSI) protocol model for a wireless local area network (WLAN). A Wi-Fi network is one type of wireless local area network (WLAN). Currently, the family of IEEE 802.11 amendments encompass six wireless modulation techniques that all use the same communication protocol among their communication elements. Other modulation techniques may be used. Current versions of IEEE 802.11 networks include IEEE 802.11a, ac, af, ah, ax, b, g, and n, representing PHY amendments to IEEE 802.11. The IEEE 802.11 working group defines numerous distinct frequency ranges for transmission frequencies, e.g. so-called "white spaces" of the VFH/UHF television transmission bands (namely frequencies that are unused or under-utilized geographically or temporally as specified in a geo-location or its proxy server, 2.4 GHz, 3.6 GHz, 4.9 GHz, 5.0-6.0 GHz bands and other bands. Each frequency range is divided into a multitude of channels. It will be appreciated that communications between devices 104 and network device 102 and/or LAN 108 can be specified to be carried out on a particular channel for a particular band.

It will be appreciated that device 102 communicates with devices 104 using the IEEE 802.11 protocol. Similarly, when LAN 108 is a WLAN, device 102 communicates with LAN 108 using the IEEE 802.11 protocol.

Devices 104 can be any type of mobile or portable electronic device that has a wireless network card, network adapter, and/or network interface controller for wirelessly communicating with device 102 and/or LAN 108. Devices 104 include, but are not limited to, laptop computers, portable electronic devices, mobile computing devices, portable computing devices, tablet computing devices, laptop computing devices, PDAs (personal digital assistant), smartphones, e-readers, and the like. Other suitable devices are within the scope of present implementations.

Trusted network 106 is a trusted enterprise network that may include local and wide area networks (LAN/WAN) and is configured for operational requirements of setting up and maintaining a secure communication link between a trusted enterprise server and a community of authorised users. Alternatively, trusted network 106 may be a trusted home network. For the purposes of the present disclosure, a trusted home network would be understood to be a private network in the home of a user configured to set up and maintain secure communication between authorised users of the network.

Link 116 comprises any suitable link for enabling LAN 108 to communicate with network 110. Similarly, links 118, 120 comprise any suitable link for enabling network 110 to communicate with trusted network 106 and AAA server 112. Links 116, 118, 120, can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth™ links, NFC (near field communication) links, WiFi links, WiMax links, packet based links, the Internet, analog networks, the PSTN (public switched telephone network), access points, and the like, and/or a combination.

Network 110 can include any suitable combination of wired and wireless networks, including but not limited to a Wide Area Network (WAN) such as the Internet, a Local Area Network (LAN) such as a corporate data network, cell phone networks, WiFi networks, WiMax networks and the like. It will be appreciated that communication between device 102 and trusted network 106 via link 114, LAN 108, link 116, network 110 and link 118 occurs though a data link layer.

Figure 2:
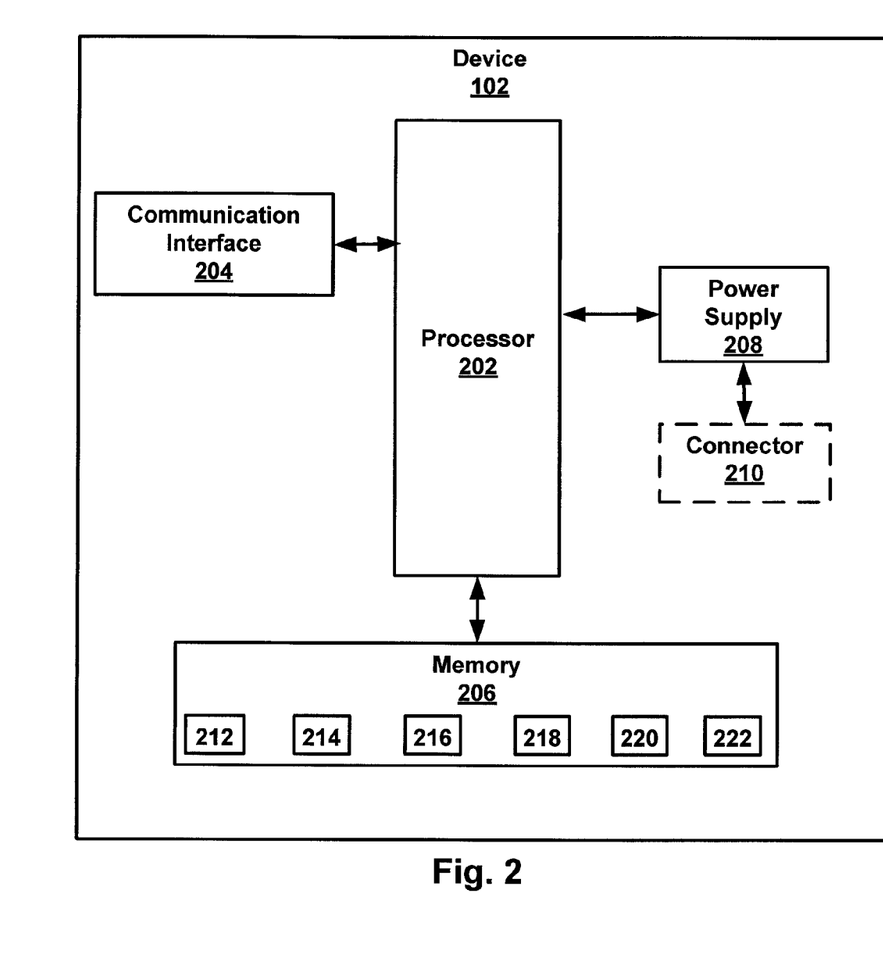
FIG. 2 is a block diagram of a device for enabling multiple wireless communication devices to communicate with a trusted network via a secure connection in accordance with non-limiting implementations.

Attention is now directed to FIG. 2, which depicts an example of device 102 according to a non-limiting implementation. In the non-limiting implementation shown in FIG. 2, device 102 is a stand-alone device for enabling devices 104 to communicate with a trusted network 106 via a secure connection. Device 102 includes multiple components, such as a processor 202 that controls the overall operation of device 102. Processor 202 is coupled to and interacts with other components of device 102, including a communications interface 204, a memory 206, and a power supply 208. Optionally, device 102 includes a connector 210 that is coupled to power supply 208.

Device 102 includes a software program or application 212 (referred interchangeably hereinafter as software 212) that controls the operation of device 102. Software 212 is normally installed on device 102 at manufacture and is typically stored in memory 206. Software 212 may be a client, such as, for example, a client establishes a secure connection to trusted network 106 using for example, a Remote Authentication Dial-In User Service (RADIUS) protocol. Software may use other suitable protocols to establish a secure connection to trusted network, such as, for example, transport layer security or secure sockets layer (TLS/SSL) or Internet Protocol Security (IPSEC). Optionally, software 212 may also establish a secure link to AAA server 112. Software 212 is executed by processor 202. Those skilled in the art will appreciate that portions of software 212, may be temporarily loaded into volatile storage unit of memory 206.

Processor 202 is further configured to interact with communication interface 204 (referred to interchangeably as interface 204) for device 102 to connect to devices 104 and LAN 108. Communication interface may be implemented as one or more radios and/or network adaptors and/or connectors to radios or network adaptors, configured to wirelessly communicate with devices 104 and/or LAN 108 using the IEEE 802.11 protocol. Thus, interface 204 thus includes the necessary hardware (e.g. radios, network interface controllers, and the like) to communicate over devices 102 and/or LAN 108.

Processor 202 is further configured to interact with power supply 208. Power supply 208 powers components of device 102 including, but not limited to processor 202, interface 204, and memory 206. Power supply 208 may include a battery, a power pack and the like.

Processor 202 is further configured to communicate with a memory 206 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 102, including software 212, as described herein are typically maintained, persistently, in memory 206 and used by processor 202 which makes appropriate utilization of volatile storage during the execution of such programming instructions. Those skilled in the art will now recognize that memory 206 is an example of computer readable media that can store programming instructions executable on processor 202. Furthermore, memory 206 is also an example of a memory unit and/or memory module.

In addition to storing software 212, memory 206 of device 102 stores data 214 corresponding to a list of non-trusted service set identifiers (SSIDs), data 216 corresponding to a list of trusted SSID's, data 218 corresponding to a secure network configuration for trusted network 106, and data 220 corresponding to a server configuration for AAA server 112. Memory 206 may also store data 222 corresponding to pre-provisioned LANs or previously detected LANs. It will be appreciated that data 214, 216, 218, 220 is normally installed on device 102, updated and maintained by an administrator of trusted network 106.

In an alternative non-limiting implementation, device 102 may include connector 210 configured to connect to a corresponding alternating current (AC) power supply. In this alternative non-limiting implementation, power supply 208 is a power adaptor (e.g. and AC-to-DC (alternating current to direct current) adaptor) that is configured to receive AC power from connector 210 and convert AC power to DC power for powering components of network device 102. Connector 210 may be any suitable connector that is configured to connect with a corresponding socket for providing power to processor 202 of device 102. For example, connector 210 may be a two or three prong AC power connector that is configured to connect with a corresponding AC wall socket. Alternatively, connector 210 may be a universal serial bus (USB) connector that is configured to connect with a USB socket or an Ethernet connector that is configured to connect with one end of an Ethernet cable. Other suitable connector/socket pairs are within the scope of present implementations.

Figure 3:
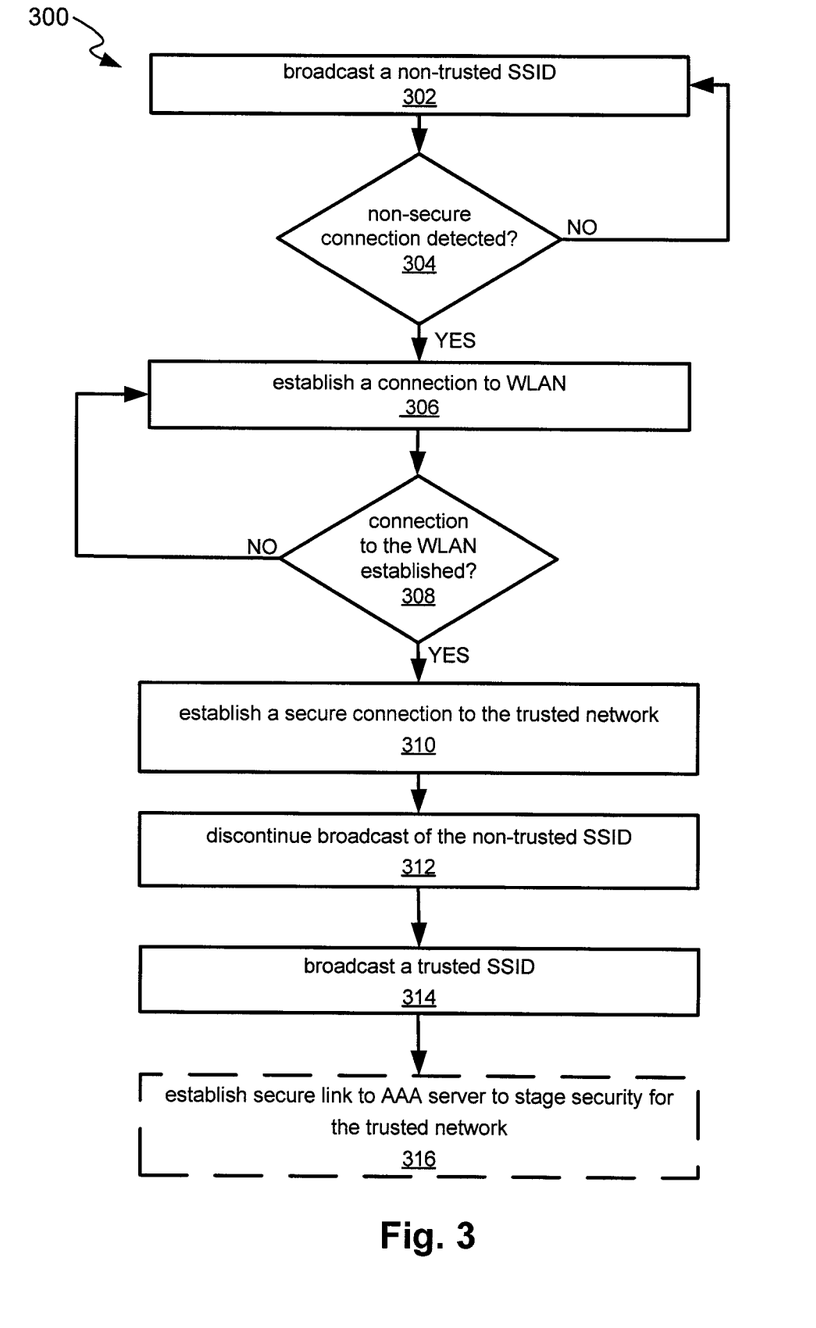
FIG. 3 is a flowchart depicting a method of enabling multiple wireless communication devices to communicate with a trusted network via a secure connection in accordance with non-limiting implementations.

Attention is now directed to FIG. 3, which depicts a flowchart of a method 300 for enabling devices 104 to establish a secure connection to trusted network 106. Method 300 may be carried out by software 212, executed, for example, by processor 202 of device 102. Coding of software 212 for carrying out method 300 is within the scope of a person of ordinary skill in the art given the present disclosure. Computer-readable code executable by processor 202 of device 102 to perform method 300 may be stored in a computer-readable storage medium, device, or apparatus, such as a non-transitory computer-readable medium.

It is to be emphasized that method 300 need not be performed in the exact sequence as shown, unless otherwise indicated; and likewise various blocks may be performed in parallel rather than in sequence; hence the elements of method 300 are referred to herein as "blocks" rather than "steps".

At block 302, processor 202 obtains data 214 from memory 206 and broadcasts a non-trusted service set identifier (SSID) from the list of non-trusted SSIDs via communication interface 204 to devices 104 that are within range of device 102. In a non-limiting implementation, the broadcasted non-trusted SSID may be configured with any suitable security protocol defined, for example, by the WiFi Alliance or in the IEEE 802.11 standard. For example, the broadcasted non-trusted SSID may be configured with WLAN link layer security defined in the IEEE 802.11 standard. Examples of WLAN link layer security defined in the IEEE 802.11 standard include, but are not limited to, WPA-Personal and WPA2-Personal.

At block 304, processor 202 detects whether any device 104 that is wirelessly communicating with device 102 has established a non-secure connection to device 102 using the non-trusted SSID that was broadcast at block 302.

When processor 202 detects that a device 104 of devices 104 has established a non-secure connection to network device 102 at block 304, method 300 proceeds to block 306.

At block 306, processor 202 establishes a connection to LAN 108.

In an example implementation where LAN 108 is a wired LAN, processor 202 establishes a connection to LAN 108 when internet protocol (IP) connectivity is detected between device 102 and LAN 108. IP connectivity may be detected, for example, when one end of an Ethernet cable is plugged into connector 210 of device 102 and another end of the Ethernet cable is plugged into a connector of LAN 108.

In another example implementation where LAN 108 is a WLAN, such as a Wi-Fi network as described above, processor 202 establishes a connection to LAN 108 by obtaining data 222 from memory 206 corresponding to pre-provisioned or previously detected LANs; searching for LAN 108, and automatically connecting to LAN 108. When LAN 108 is not included in data 222, a user may use device 104 that is wirelessly connected to device 102 via non-secure connection, to interact with device 102 to: initiate a scan for LANs; display the list of LANs on a display of device 104; and select LAN 108 from the list of LANs displayed on the display of device 104 using, for example, an input device of device 104.

At block 308, processor 202 determines whether a connection to LAN 108 has been established via link 114.

If, at block 308, processor 202 determines that a connection to LAN 108 via link 114 has been established, method 300 proceeds to block 310. If, at block 308, processor 202 determines that a connection to LAN 108 via link 114 has not been established, method 300 returns to block 306.

It will be appreciated that LAN 108 may require a user to login, or accept terms and conditions for LAN 108, through a browser session (commonly referred to as a captive portal login) prior to allowing any device to establish a connection to network 110 via link 116. Thus, a user of device 104 that is wirelessly connected to device 102 using the non-trusted SSID may need to establish a browser session on device 104 that is wirelessly connected to device 102 to obtain Internet access in order to login, or accept terms and conditions for LAN 108.

After processor 202 has established a connection to network 110 via link 114 and obtained access to network 110 via link 116, processor 202 obtains, from memory 206, data 218 corresponding to a secure network configuration for trusted network 106. Alternatively, processor 202 may communicate with device 104 that is wirelessly connected to device 102 to instruct device 104 to launch a graphical user interface to obtain credential information for accessing trusted network 106.

At block 310, processor 202 establishes a secure connection to trusted network 106. Processor 202 establishes a secure connection to trusted network 106 using data 218 corresponding to a secure network configuration for trusted network 106. Method 300 then proceeds to block 312.

At block 312, processor 202 discontinues broadcasting the non-secure SSID. Method 300 then proceeds to block 314.

At block 314, processor 202 obtains data 214 from memory 206 and broadcasts a trusted SSID from the obtained list of trusted SSID's to devices 104 to enable devices 104 to wirelessly connect to device 102 to communicate with trusted network 106 via the secure connection. The broadcasted trusted SSID may be configured with any suitable security protocol defined, for example, by the WiFi Alliance or in the IEEE 802.11 standard. For example, the broadcasted trusted SSID may be configured with WLAN-Enterprise link layer security when the trusted network is a trusted enterprise network. Examples of WLAN-Enterprise link layer security include, but are not limited to, WPA2-Enterprise WLAN link layer security. Alternatively, the broadcasted trusted SSID may be configured with WLAN link layer security when the trusted network is a trusted home network. Examples of WLAN link layer security defined in the IEEE 802.11 standard include, but are not limited to WPA-Personal and WPA2-Personal.

Optionally, after method 300 broadcasts a trusted SSID to devices 104 at block 314, method 300 can proceed to block 316. Method 300 proceeds to block 306 when trusted network 106 is a trusted enterprise network.

At block 316, processor 202 can establish a secure link to AAA server 112 to provide the WPA-Enterprise link layer security or the WPA2-Enterprise WLAN link layer security for the trusted SSID when trusted network 106 is a trusted enterprise network. Processor 202 can obtain data 220 from memory 206 and establish a secure link to AAA server 112. Once a secure link has been established to AAA server 112, processor 202 enables a device 104 to access the secure link to AAA server 112 when device 104 wirelessly connects to device 102 using the broadcasted trusted SSID in order to authenticate device 104.

In a non-limiting implementation, processor 202 can receive, via the secure connection to trusted network 106, policy information from trusted network 106. In another non-limiting implementation, processor 202 can receive, via the secure link, policy information and/or accounting records from a service provider via the AAA server 112.

In a non-limiting implementation, trusted network 106 may be a trusted enterprise network. In another non-limiting implementation, trusted network 106 may be a trusted home network.

In another non-limiting implementation, when trusted network 106 is an enterprise trusted network, the trusted SSID may be configured with WPA2-Enterprise WLAN link layer security.

Method 300 will now be discussed with reference to FIG. 4, FIG. 5, FIG. 6, and FIG. 7, which depicts network device 102 operating within system 100 in accordance with an example implementation. In the example shown in FIG. 4, FIG. 5, FIG. 6, and FIG. 7, three devices 104, devices 104-1, 104-2, and 104-3 are within communication range of network device 102 and a user of devices 104-1, 104-2, and 104-3 desires to establish a secure connection from each device 104-1, 104-2, and 104-3 to trusted network 106.

Figure 4:
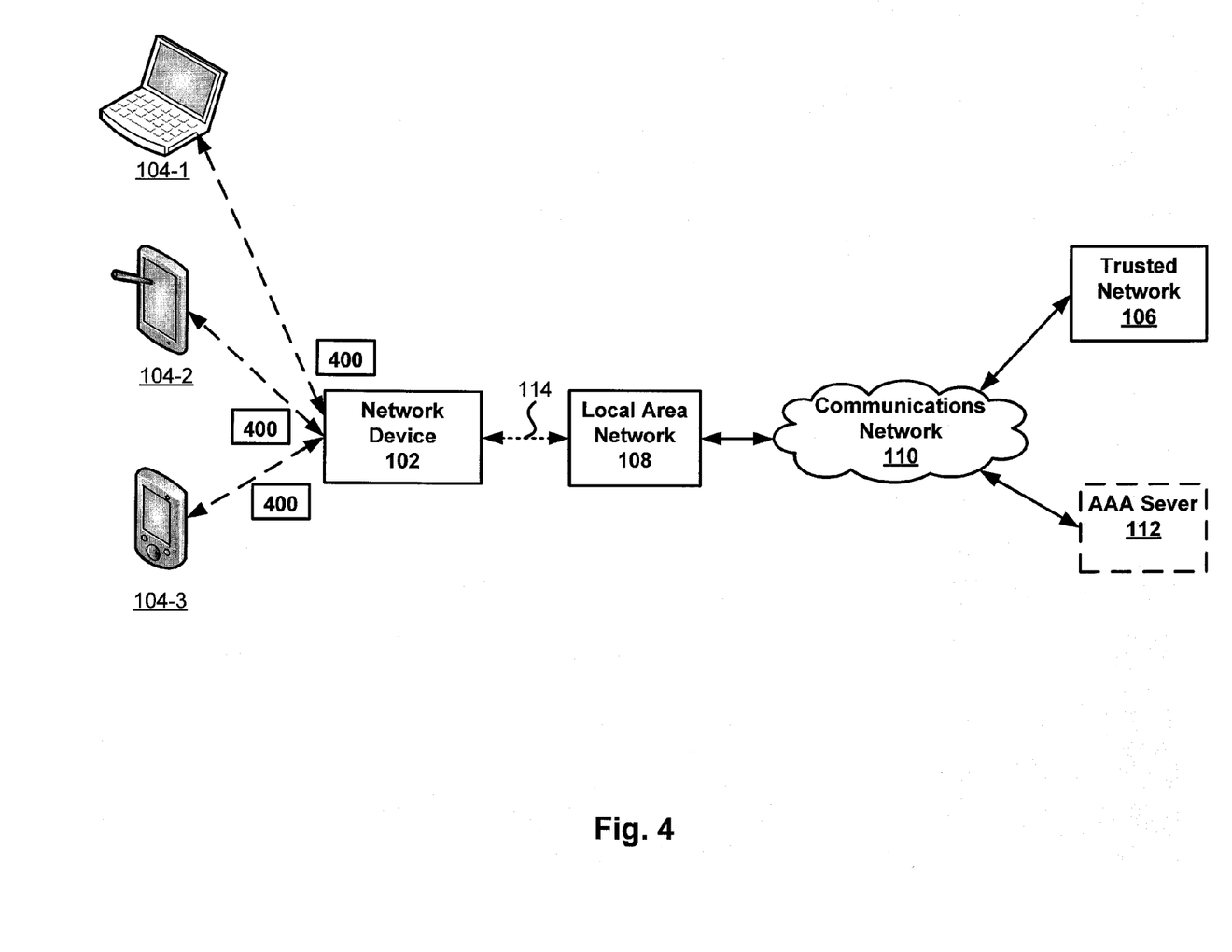
FIG. 4 is a block diagram depicting the system of FIG. 1, with a non-secure service set identifier (SSID) broadcast from the network device, according to non-limiting implementations.

In FIG. 4, network device 102 is powered on, for example, by pressing on a power button (not shown) of device 102 in a non-limiting implementation. Alternatively, network device 102 may be powered on by plugging connector 210 of network device 102 into a corresponding socket of a power supply as described above.

Figure 5:
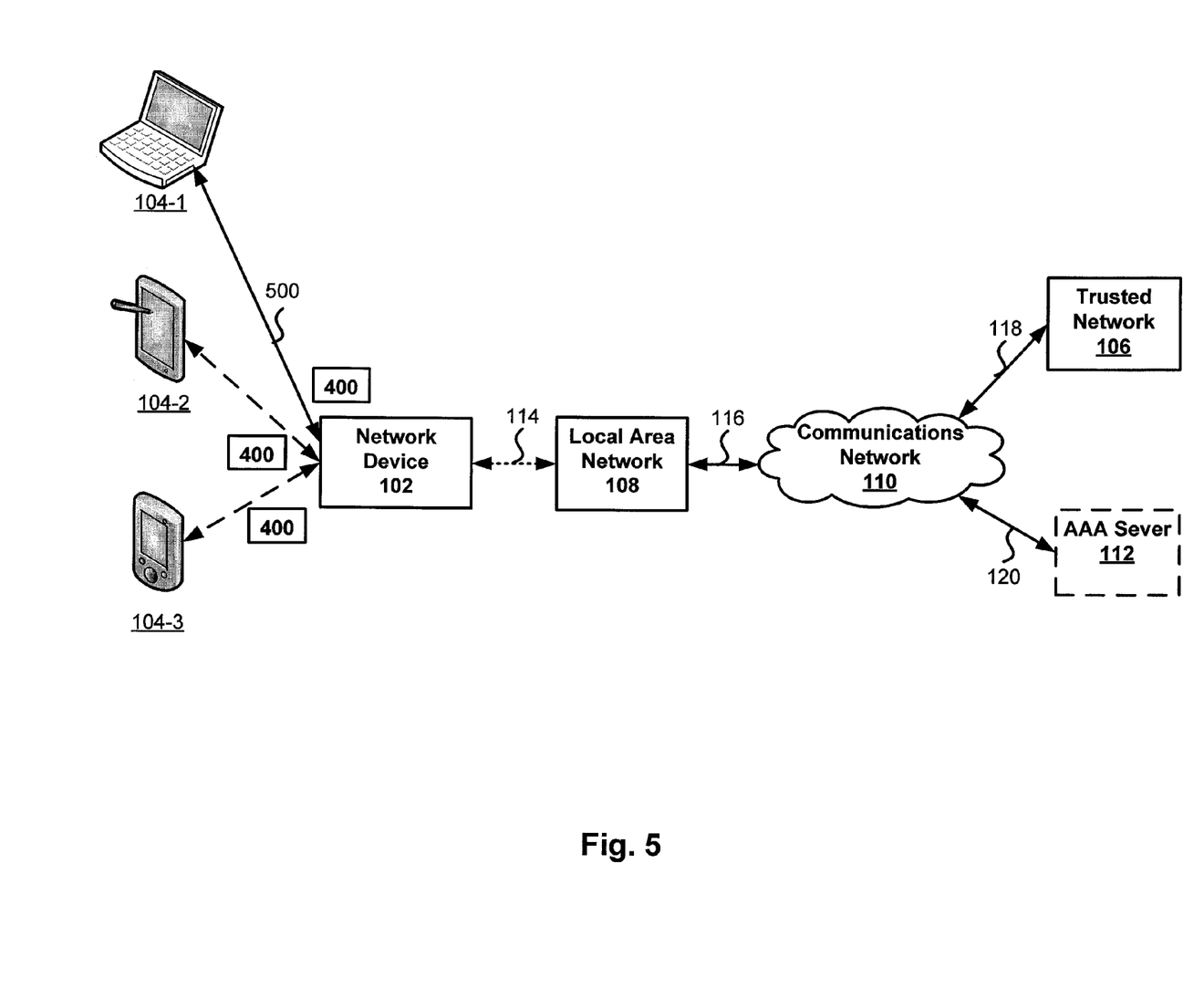
FIG. 5 is a block diagram depicting the system of FIG. 1, with a non-secure connection established between the network device and a wireless communication device, according to non-limiting implementations.
Figure 6:
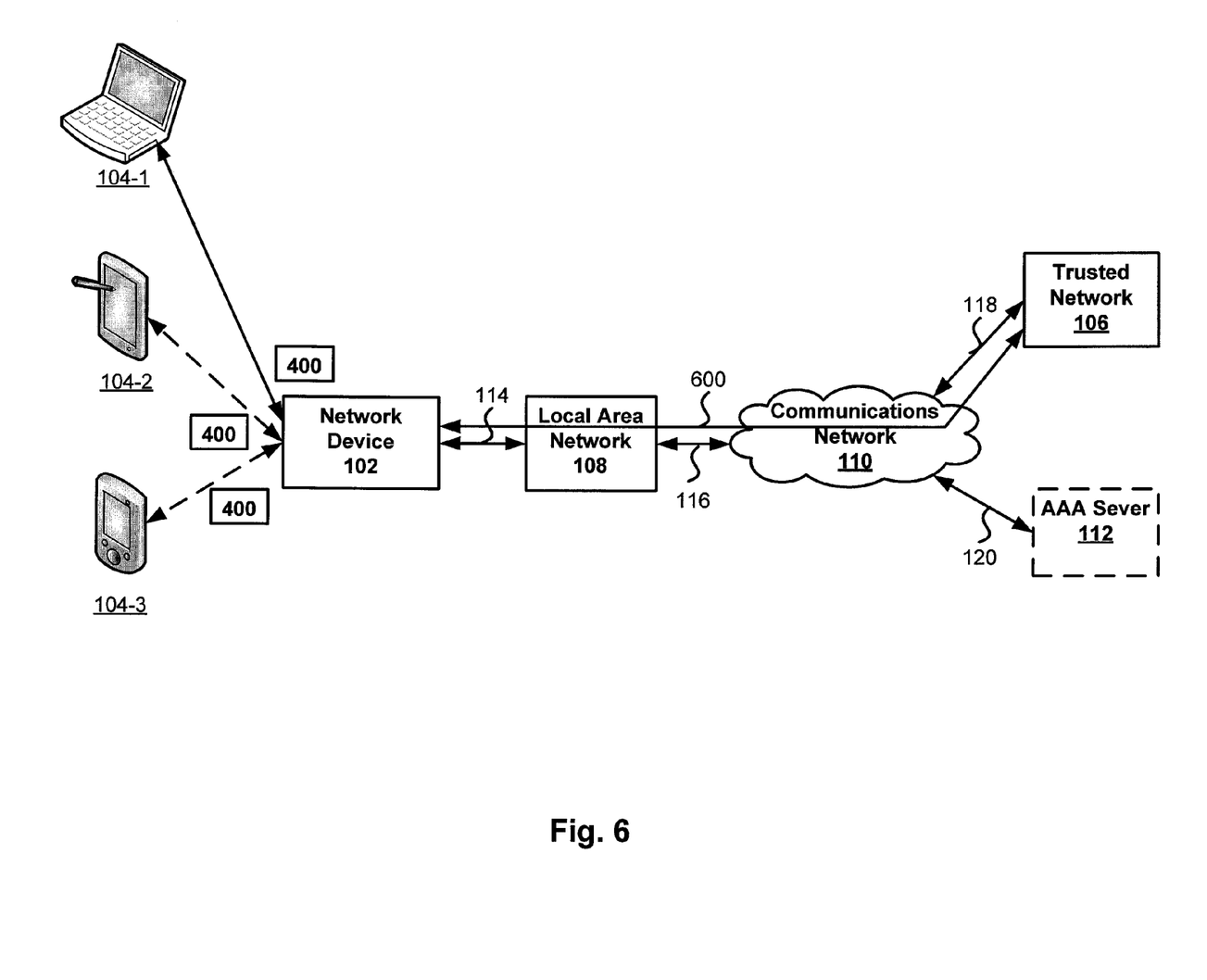
FIG. 6 is a block diagram depicting the system of FIG. 1, with a secure connection established between the network device and a trusted network, according to non-limiting implementations.
Figure 7:
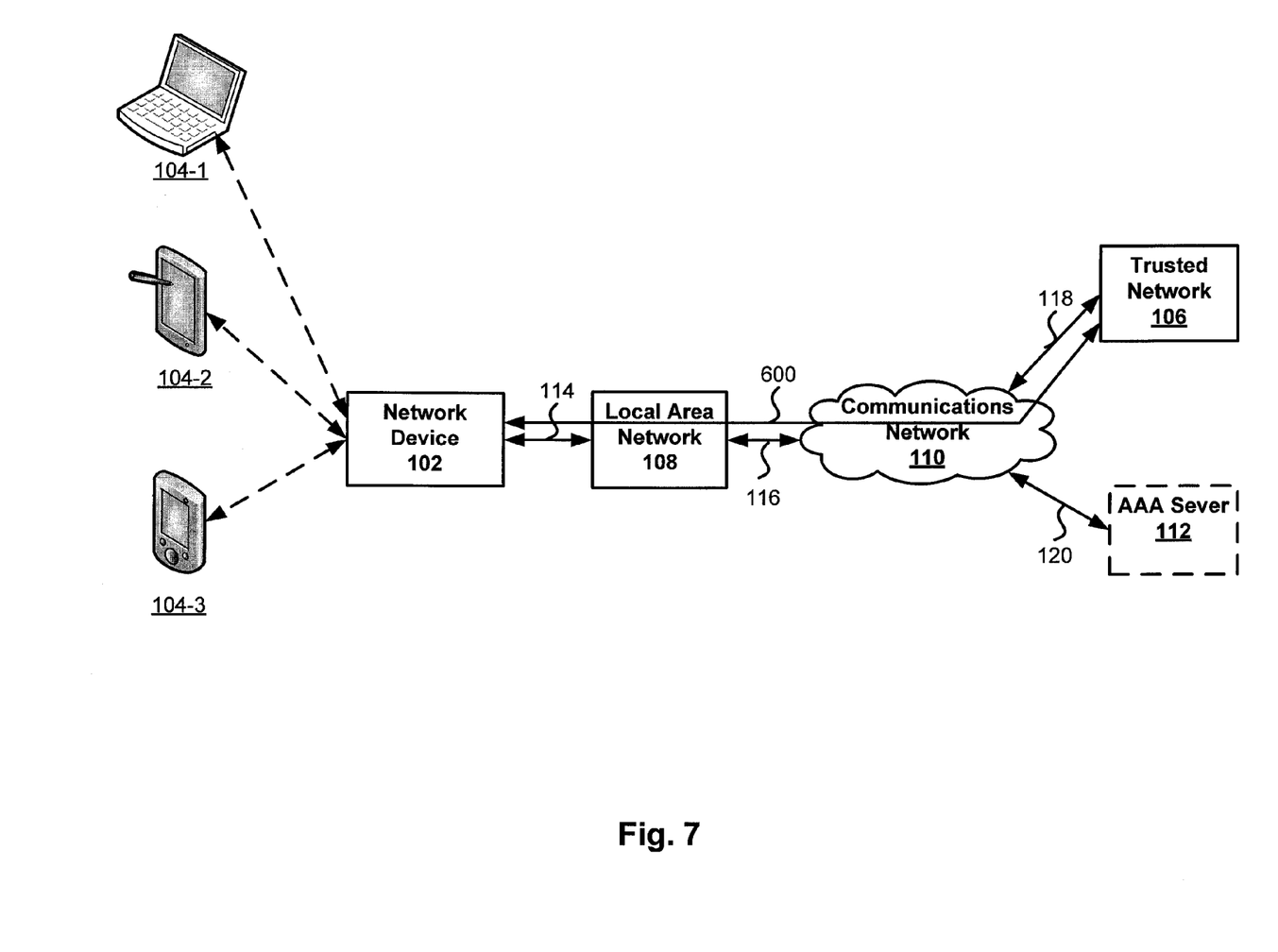
FIG. 7 is a block diagram depicting the system of FIG. 1, with broadcast of the non-trusted SSID from the network device being discontinued, according to non-limiting implementations.
Figure 8:
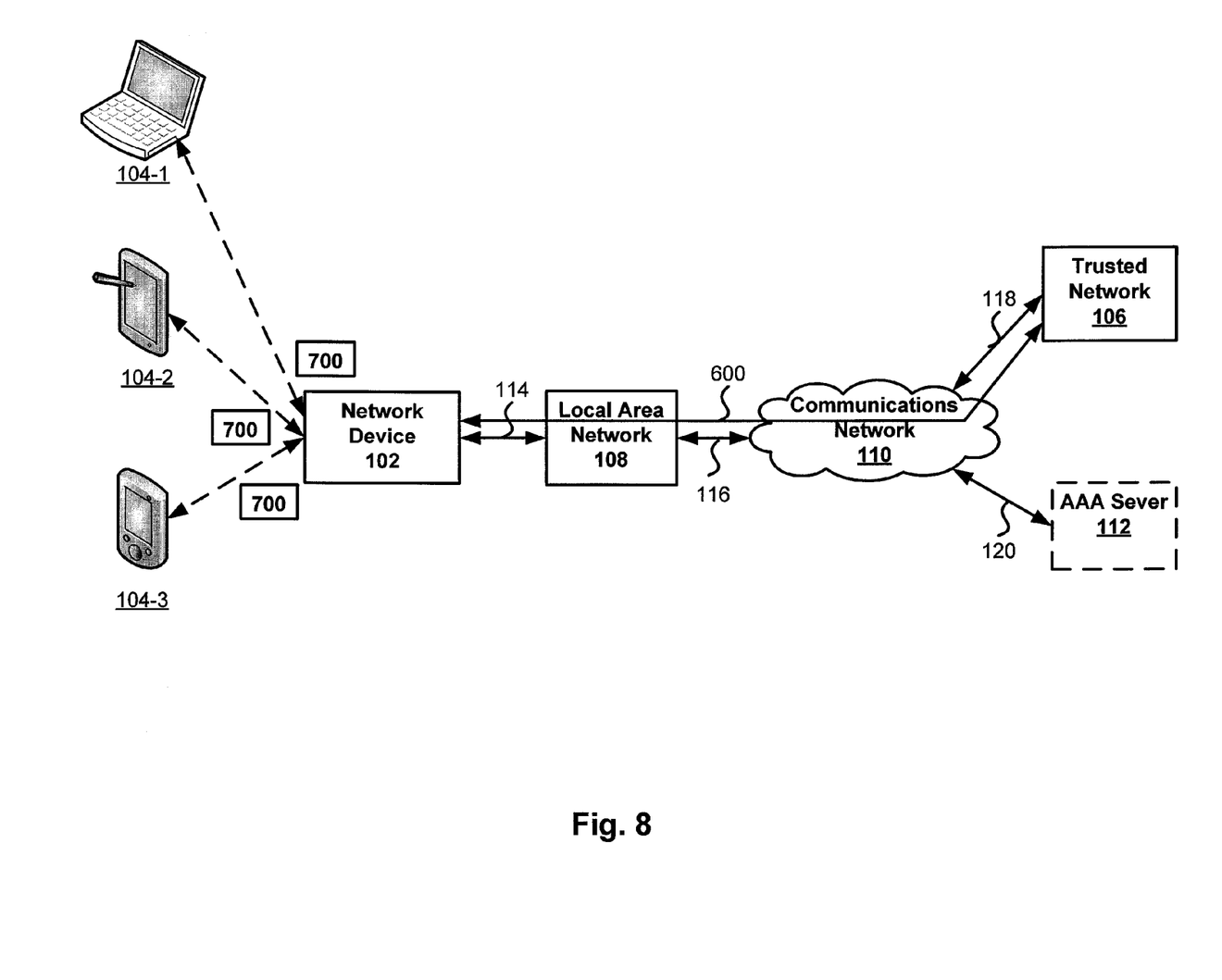
FIG. 8 is a block diagram depicting the system of FIG. 1, with a secure SSID broadcast from the network device, according to non-limiting implementations.

Once device 102 is powered on and processor 202 receives power from power supply 208, device 102 begins, at block 302, broadcasting a non-trusted SSID 400 to devices 104-1, 104-2, and 104-3. In FIG. 5, device 104-1 receives the non-trusted SSID 400 from network device 102 and establishes a connection 500 to network device 102 using non-trusted SSID 400. In the example implementation shown in FIG. 5, the non-trusted SSID may be configured as MyNetDevice-Untrusted SSID. Alternatively, the non-trusted SSID may be configured with WPA2-Personal security. When network device 102 detects that device 104-1 has established connection 500 with network device 102 using non-trusted SSID 400, network device 102 scans, at block 306, to establish a connection to LAN 108. When network device 102 has established connection 114 to LAN 108, as shown in FIG. 6, network device establishes, at block 310, a secure connection 600 with trusted network 106. Network device 102 then discontinues broadcast of non-trusted SSID 400, as depicted in FIG. 7, and broadcasts a trusted SSID 700, as depicted in FIG. 8. Each device 104-1, 104-2, and 104-3 can wirelessly connect to network device 102 to communicate with trusted network 106 using secure connection 600.

Figure 9:
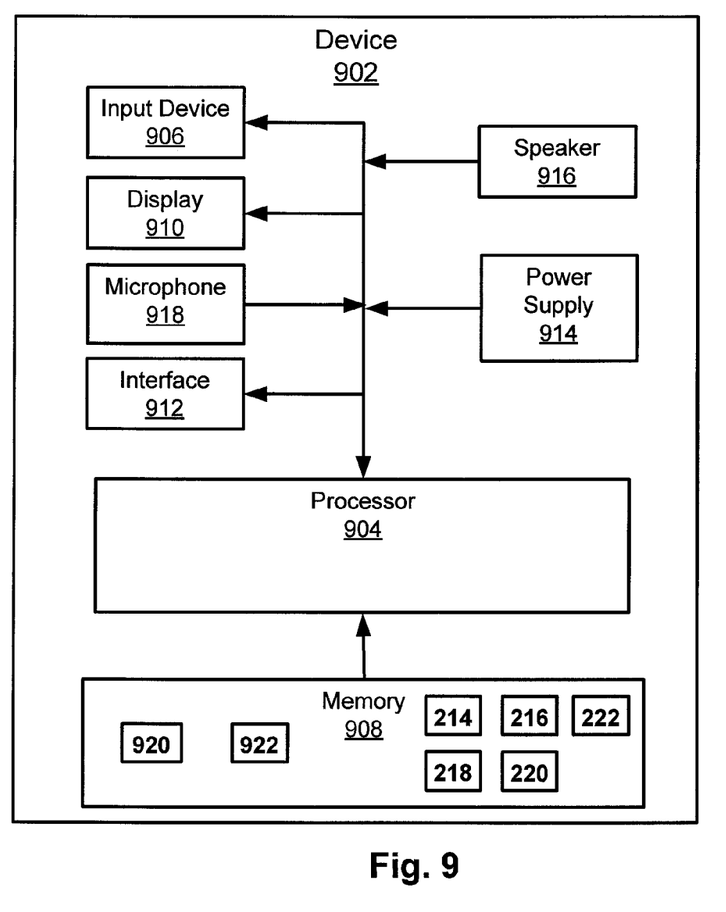
FIG. 9 is a block diagram of a device for enabling multiple wireless communication devices to communicate with a trusted network via a secure connection in accordance with another non-limiting implementation.
Figure 10:
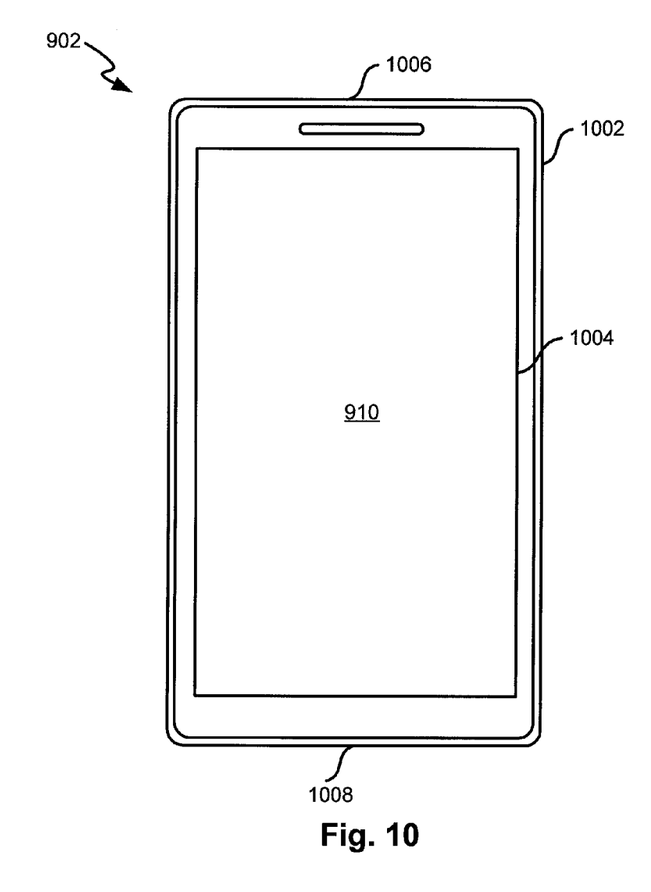
FIG. 10 is a front view of the device depicted in FIG. 9.

Attention is now directed to FIG. 9 and FIG. 10, which depict an example implementation of another device 902 that enables multiple devices 104 to communicate with a trusted network 106 via a secure connection. Device 902 may be used instead of device 102 in system 100 of FIG. 1 to enable multiple devices 104 to communicate with a trusted network 106 via a secure connection.

Device 902 may be any type of electronic device that is capable of acting as a wireless access point or hub in order to enable devices 104 to communicate with LAN 108 via device 902. Device 902 may include, but is not limited to, any suitable combination of electronic devices, communications devices, computing devices, mobile electronic devices, telephones, PDAs (personal digital assistants), cell-phones, smartphones, and the like. Other suitable devices are within the scope of present implementations.

It should be emphasized that the shape and structure of device 902 in FIG. 9 and FIG. 10 are purely examples, and contemplate a device that can be used for both wireless voice (e.g. telephony) and wireless data communications (e.g. email, web browsing, text, and the like).

Device 902 includes multiple components, such as a processor 904 that controls the overall operation of device 902. Processor 904 is coupled to and interacts with other components of device 902, an input device 906, memory 908, a display 910, a communication interface 912, a power supply 914, and optionally a speaker 916 and a microphone 918.

Input device 906 is generally configured to receive input data, and may include any suitable combination of input devices, including but not limited to a keyboard, a keypad, a pointing device, a mouse, a track wheel, a trackball, a touchpad, a touchscreen and the like. Other suitable input devices are within the scope of present implementations.

Input from input device 906 is received at processor 904. Processor 904 may be implemented as a plurality of processors, and/or as one or more DSPs including but not limited to one or more central processors (CPUs). Processor 904 is configured to communicate with memory 908 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 902 as described herein are typically maintained, persistently, in memory 908 and used by processor 904 which makes appropriate utilization of volatile storage during the execution of such programming instructions. Those skilled in the art will now recognize that memory 908 is an example of computer readable media that can store programming instructions executable on processor 904. Furthermore, memory 908 is also an example of a memory unit and/or memory module.

Device 902 also includes an operating system 920 and software programs or applications 922 that control basic device operations, including data and voice communication applications. Operating system 920 and the software programs or applications 922 are normally installed on the device 902 at manufacture and are typically stored in memory 908. Operating system 920 and the software programs or applications 922 are executed by the processor 904. Those skilled in the art will appreciate that portions of operating system 920 and software programs or applications 922, such as specific device applications, or parts thereof, may be temporarily loaded into volatile storage unit of memory 908. Other software programs can also be included, as is well known to those skilled in the art.

Processor 904 is further configured to interact with display 910, which comprises any suitable one of, or combination of, flat panel displays (e.g. LCD (liquid crystal display), plasma displays, OLED (organic light emitting diode) displays, touch-sensitive displays such as capacitive, resistive, infrared, surface acoustic wave (SAW), optical touchscreen displays, CRTs (cathode ray tubes) and the like. When display 910 comprises a touch screen, it is appreciated that display 910 and input device 906 may be combined into one apparatus.

Processor 904 is further configured to interact with communication interface 912 (referred to interchangeably as interface 912), which may be implemented as one or more radios and/or connectors and/or network adaptors, configured to wirelessly communicate with one or more communication networks (not depicted). It will be appreciated that interface 912 is configured to correspond with network architecture that is used to implement wireless communication with devices 104 and to implement link 114. Interface 912 may also be configured to correspond with other network architectures to enable device 902 to communication with network 110, such as for example, any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, Bluetooth™ links, NFC (near field communication) links, WLAN (wireless local area network) links, WiFi links, WiMax links, packet based links, the Internet, analog networks, the PSTN (public switched telephone network), access points, and the like, and/or a combination.

Power supply 914 powers components of device 902 including, but not limited to processor 904, input device 906, display 910, interface 912, speaker 916, and microphone 918. Power supply 914 may include a battery, a power pack and the like; however, in other implementations, power supply 914 may include a connection to a mains power supply and/or a power adaptor (e.g. and AC-to-DC (alternating current to direct current) adaptor).

Speaker 916, when present, comprises any suitable speaker for providing sound data, audible alerts, audible communications from remote communication devices, and the like, at device 902. Microphone 918, when present, comprises any suitable microphone for receiving sound data.

As with device 102, device 902 stores data 214 corresponding to a list of non-trusted service set identifiers (SSIDs), data 216 corresponding to a list of trusted SSID's, data 218 corresponding to a secure network configuration for trusted network 106, data 220 corresponding to a server configuration for AAA server 112 and optionally, data 222 corresponding to pre-provisioned LANs or previously detected LANs, in memory 908. It will be appreciated that data 214, 216, 218, 220 is normally installed on device 902, updated and maintained by an administrator of trusted network 106.

It will be appreciated that device 902 is configured to carry out method 300 for enabling devices 104 to establish a secure connection to trusted network 106 as described above. In the example implementation shown in FIG. 9 and FIG. 10, method 300 is carried out by software programs or applications 922, executed, for example, by processor 904 of device 902. Coding of software programs or applications 922 for carrying out method 300 is within the scope of a person of ordinary skill in the art given the present disclosure. Computer-readable code executable by processor 904 of device 902 to perform method 300 may be stored in a computer-readable storage medium, device, or apparatus, such as a non-transitory computer-readable medium. It is to be emphasized, that method 300 need not be performed by device 902 in the exact sequence as shown, unless otherwise indicated; and likewise various blocks may be performed in parallel rather than in sequence; hence the elements of method 300 are referred to herein as "blocks" rather than "steps".

The present disclosure provides a device, method, and system that facilitate establishing a secure connection between multiple wireless communication devices and a trusted network without a user having to provision and configure each wireless communication device to establish secure connection to a trusted network.

Attention is now directed to FIG. 10, which depicts a front view of an example implementation of device 902. Device 902 includes a body 1002 that includes a front face 1004 a top wall 1006, and a bottom wall 1008 when orientated for use. Display 910 is disposed in body 1002 and exposed at front face 1004 for user-interaction.

Those skilled in the art will appreciate that in some implementations, the functionality of devices 102, 902 can be implemented using pre-programmed hardware or firmware elements (e.g., application specific integrated circuits (ASICs), electrically erasable programmable read-only memories (EEPROMs), etc.), or other related components. In other implementations, the functionality of device 102 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, the computer-readable program can be stored as a computer program product comprising a computer usable medium. Further, a persistent storage device can comprise the computer readable program code. The computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
   a memory storing data corresponding to a list of non-trusted service set identifiers and data corresponding to a list of trusted service set identifiers;
   a communication interface configured to communicate with wireless communication devices and local area networks (LANs); and,
   a processor operably coupled to the memory and the communication interface, the processor configured to:
   broadcast a non-trusted service set identifier (SSID) obtained from the list of non-trusted service set identifiers;
   in response to detecting a non-secure connection to a wireless communication device of the wireless communication devices using the non-trusted SSID, establish a connection to a local area network (LAN) of the LANs; and
   in response to establishing a connection to the LAN:
   accessing a trusted network via the connection to LAN, a link between the LAN and a communication network, and a link between the communication network and the trusted network to establish a secure connection between the device and the trusted network;

discontinue broadcast of the non-trusted SSID; and broadcast a trusted SSID obtained from the list of trusted service set identifiers to each of the wireless communication devices to enable each of the wireless communication devices to wirelessly connect to the device using the trusted SSID and to communicate with the trusted network via the secure connection.

2. The device of claim 1, wherein the LAN is a wireless local area network (WLAN) and the non-trusted SSID is configured with WLAN link layer security.

3. The device of claim 1, wherein the trusted network is a trusted enterprise network or a trusted home network.

4. The device of claim 3, wherein the trusted network is a trusted enterprise network and the trusted SSID is configured with WPA-Enterprise link layer security or WPA2-Enterprise WLAN link layer security.

5. The device of claim 3, wherein the trusted network is a trusted home network and the trusted SSID is configured with WPA2-Personal WLAN link layer security.

6. The device of claim 4, wherein the processor is further configured to:

in response to establishing the connection to the LAN:
 establish a secure link to an authentication, authorization, and accounting (AAA) server to provide the WPA-Enterprise link layer security or the WPA2-Enterprise WLAN link layer security for the trusted SSID.

7. The device of claim 6, wherein the processor is further configured to:

route, via the secure link and using a Remote Authentication Dial-In User Service (RADIUS) protocol, WLAN Extensible Authentication Protocol (EAP) authentication frames to the trusted enterprise network.

8. The device of claim 6, wherein the processor is further configured to:

receive, via the secure link, policy information from the trusted enterprise network.

9. The device of claim 6, wherein the processor is further configured to:

receive, via the secure link, at least one of policy information and accounting records from a service provider via the AAA server.

10. The device of claim 1, wherein the memory further stores data corresponding to a secure network configuration, and wherein the processor is configured to establish the secure connection between the device and the trusted network by:

obtaining, from the memory, the data corresponding to the secure network configuration; and establishing the secure connection between the device and the trusted network using the data corresponding to the secure network configuration.

11. The device of claim 1, wherein each trusted service set identifier in the list of trusted service set identifiers is configured with a security protocol defined by the WiFi Alliance or the IEEE 802.11 standard.

12. A method for enabling wireless communication devices to communicate with a trusted network via a secure connection, the method comprising:

at a device comprising a memory storing data corresponding to a list of non-trusted service set identifiers and data corresponding to a list of trusted service set identifiers, a communication interface configured to communicate with the wireless communication devices and local area networks (LANs), and a processor, broadcasting a non-trusted service set identifier (SSID) obtained from the list of non-trusted service set identifiers;

in response to detecting a non-secure connection to a wireless communication device of the wireless communication devices using the non-trusted SSID, establishing a connection to a local area network (LAN) of the LANs;

in response to establishing a connection to the LAN:

accessing a trusted network via the connection to LAN, a link between the LAN and a communication network, and a link between the communication network and the trusted network to establish a secure connection between the device and the trusted network;

discontinuing broadcast of the non-trusted service set identifier (SSID); and broadcasting a trusted SSID obtained from the list of trusted service set identifiers to each of the wireless communication devices to enable each of the wireless communication devices to wirelessly connect to the device using the trusted SSID and to communicate with the trusted network via the secure connection.

13. The method of claim 12, wherein the LAN is a wireless local area network (WLAN) and the non-trusted SSID is configured with WLAN link layer security.

14. The method of claim 13, wherein the trusted network is a trusted enterprise network or a trusted home network.

15. The method of claim 12, wherein the trusted network is a trusted enterprise network and the trusted SSID is configured with WPA-Enterprise link layer security or WPA2-Enterprise WLAN link layer security.

16. The method of claim 12, wherein the trusted network is a trusted home network and the trusted SSID is configured with WPA2-Personal WLAN link layer security.

17. The method of claim 15, further comprising:

in response to establishing the connection to the LAN:
 establish a secure link to an authentication, authorization, and accounting (AAA) server to provide the WPA-Enterprise link layer security or the WPA2-Enterprise WLAN link layer security for the trusted SSID.

18. The method of claim 17, further comprising:

routing, via the secure link and using a Remote Authentication Dial-In User Service (RADIUS) protocol, WLAN Extensible Authentication Protocol (EAP) authentication frames to the trusted enterprise network.

19. The method of claim 17, further comprising:

receiving, via the secure link, policy information from the trusted enterprise network.

20. The method of claim 15, further comprising:

receiving, via the secure link, at least one of policy information and accounting records from a service provider via the AAA server.

21. A non-transitory, tangible machine readable storage medium encoded with machine executable instructions, wherein execution of the machine executable instructions is for:

at a device comprising a memory storing data corresponding to a list of non-trusted service set identifiers and data corresponding to a list of trusted service set identifiers, a communication interface configured to communicate with the wireless communication devices and local area networks (LANs), and a processor, broadcasting a non-trusted service set identifier (SSID) obtained from the list of non-trusted service set identifiers;

in response to detecting a non-secure connection to a wireless communication device of the wireless communication devices using the non-trusted SSID, establishing a connection to a local area network (LAN) of the LANs;

in response to establishing a connection to the LAN:

accessing a trusted network via the connection to LAN, a link between the LAN and a communication network, and a link between the communication network and the trusted network to establish a secure connection between the device and the trusted network;

discontinuing broadcast of the non-trusted service set identifier (SSID); and broadcasting a trusted SSID obtained from the list of trusted service set identifiers to each of the wireless communication devices to enable each of the wireless communication devices to wirelessly connect to the device using the trusted SSID and to communicate with the trusted network via the secure connection.

22. The method of claim 12, wherein the memory further stores data corresponding to a secure network configuration, and wherein establishing the secure connection between the device and the trusted network comprises:

obtaining, from the memory, the data corresponding to the secure network configuration; and establishing the secure connection between the device and the trusted network using the data corresponding to the secure network configuration.

* * * * *